United States Patent [19]

Gellman et al.

[11] 4,454,164

[45] Jun. 12, 1984

[54] SOFT CANINE BISCUIT CONTAINING DISCRETE MEAT AND/OR MEAT BY-PRODUCT PARTICLES AND METHOD FOR MAKING SAME

[75] Inventors: Gary Gellman, Pomona, N.Y.; George A. Erfurt, Lawrenceville; James E. Roe, Wayne, both of N.J.

[73] Assignee: Nabisco Brands, Inc., Parsippany, N.J.

[21] Appl. No.: 341,970

[22] Filed: Jan. 22, 1982

[51] Int. Cl.³ ............................................. A23K 1/00
[52] U.S. Cl. ................................ 426/549; 426/466; 426/512; 426/646; 426/805
[58] Field of Search ............... 426/549, 555, 560, 623, 426/466, 630, 635, 805, 512, 646

[56] References Cited

U.S. PATENT DOCUMENTS

| | | | |
|---|---|---|---|
| 3,467,525 | 9/1969 | Hale | 426/285 |
| 3,883,672 | 5/1975 | Bone et al. | 426/72 X |
| 3,959,511 | 5/1976 | Balaz et al. | 426/549 |
| 4,006,266 | 2/1977 | Bone et al. | 426/623 X |
| 4,039,689 | 8/1977 | Bone | 426/103 X |
| 4,190,679 | 2/1980 | Coffee et al. | 426/623 |
| 4,273,788 | 6/1981 | Bone et al. | 426/104 |
| 4,284,652 | 8/1981 | Christensen | 426/250 X |
| 4,310,558 | 1/1982 | Nahm | 426/560 X |

Primary Examiner—R. B. Penland
Attorney, Agent, or Firm—R. Kornutik

[57] ABSTRACT

A dry soft canine biscuit having visually apparent, discrete meat and/or meat by-product particles distributed substantially uniformly throughout the biscuit is obtained by blending the non-fat solids portion of a soft biscuit dough with particles which are substantially inert with respect to the biscuit dough, mixing the dry-blended mixture with water plus optional humectant to form an intermediate stage dough, admixing the latter with the fat portion of the biscuit dough to form a final dough, forming the final dough into pieces, and baking and drying the formed pieces to obtain a microbiologically stable product which can be packaged without a barrier material. Meat and/or meat by-product particle inertness is made possible by using particles having: (1) a moisture content of 35% by weight or less and, (2) a water activity which is less than the water activity of said soft biscuit dough. The substantial absence of meat particle color bleed into the biscuit is principally due to the use of meat products wherein the color is formed as part of the protein matrix. The discrete, visually apparent dehydrated meat particles enhance the palatability and visual attractiveness of the dry biscuit.

18 Claims, No Drawings

SOFT CANINE BISCUIT CONTAINING DISCRETE MEAT AND/OR MEAT BY-PRODUCT PARTICLES AND METHOD FOR MAKING SAME

BACKGROUND OF THE INVENTION

1. Field of the Invention

This invention relates to a method for incorporating animal protein into a biscuit dough to obtain a soft, dry canine biscuit having animal protein particles which are visually apparent as discrete particles and which are distributed substantially uniformly throughout the biscuit. This invention also relates to a dry, soft canine biscuit containing discrete animal protein particles. The products have enhanced palatability and enhanced eye appeal.

2. Description of the Prior Art

Dry pet foods are commonly cereal type materials having a low moisture content of less than about 15% by weight. As a result of their low moisture content, they resist mold growth and bacterial spoilage. Additionally, they can often be packaged and stored in containers, such as a box, without the need for hermetic sealing and without the need for a moisture barrier. Dry pet foods typically have low palatability because of their low moisture content.

The incorporation of meat products, fish products, and poultry products into a farinaceous pet food to improve palatability and to improve nutritional values of dry pet foods, intermediate moisture products, and high moisture content pet foods (more than about 50% by weight water) is known in the art.

U.S. Pat. No. 3,946,123 discloses an aqueous suspension or broth of meat and meat by-products consisting in part or entirely of fish and flavored cereal chunks. The meat and meat by-products that may be used include those of foul and fish as well as that of mammals such as cattle, swine, goats, and the like. Due to the high moisture content of the product, it must be packaged in cans. In U.S. Pat. No. 4,158,706 a high moisture pet food product containing farinaceous and proteinaceous components such as meats, fish, and poultry is impregnated with a preservative, such as succinic acid to enable packaging within a paper or polymer film. These high moisture content products have a high shipping weight for a given amount of nutritive value and do not provide surface resistance for strengthening of gums and for the removal of plaque from teeth.

The production of dry pet foods which contain proteinaceous and farinaceous material is disclosed in U.S. Pat. Nos. 3,962,462, 4,020,187, 4,039,689, 4,055,681, 4,145,447, 4,215,149, and 4,229,485.

In U.S. Pat. No. 3,962,462 the ingredients are first dry-blended and then water and water-containing ingredients are added until a cohesive dough is formed. A stabilizing system comprising a sugar, an edible acid, and an antimycotic provides stability within the pet food when the pet food is subjected to semi-moist conditions. The product is produced in wafer form for packaging with a semi-moist pet food. The proteinaceous material includes meat, such as the flesh of cattle, swine, sheep, poultry, and fish as well as various meals such as meat and bone meal, fish meal and the like.

In U.S. Pat. No. 4,020,187 tallow or lard is added to a water slurry of a ground mixture of meat and meat by-products to raise the resulting fat content of the mixture to at least 25%. The resulting mixture is then homogenized to liquefy and reduce the particle size and to uniformly distribute the fat content through the meat mixture. Dry farinaceous ingredients are ground and added to the homogenized meat mixture. The blended mixture is subjected to temperatures of from 225° to 325° F. at a pressure of at least 50 p.s.i. The product is expanded, cut, and dried to obtain a product having a final moisture content of from 7% to 15%. The product, it is disclosed, is not externally greasy and may be packaged in ordinary paper bags or in plastic wrap.

A dry, soft pet food is produced in U.S. Pat. No. 4,039,689 using low temperatures and pressures. The use of the low processing temperatures, less than about 130° F., leads to the soft dry nature of the pet food, it is disclosed. Meat and meat by-products as well as dried animal by-products can be used as a protein source for the pet food in U.S. Pat. No. 4,039,689. The dried animal by-products include meat meal and bone meal.

U.S. Pat. No. 4,055,681 like U.S. Pat. No. 4,039,689 produces a soft dry pet food having a meat-like texture and appearance. Meat meal is disclosed as a protein source and fresh meat and meat by-products are used to impart palatability to the pet food.

In the production of the dry pet food products according to the processes of the above patents, the use of wet meat products causes substantial smearing or blending of the meat into the farinaceous material. It also causes bleeding of the protein colors into the farinaceous material which reduces the visual attractiveness of the product to the consumer and which reduces the product's hardness.

A hard dry pet food is produced in U.S. Pat. No. 4,145,447. High pressures, of at least about 100 p.s.i. are used to obtain a product which is hard enough to provide chew-resistance for the removal of plaque or tartar from the animal's teeth. The product is a long-lasting one which requires about 30 minutes to 2 hours for a 25 lb. dog to consume. Dry components are mixed until homogeneous and then sufficient water is added to wet the product without affecting the apparent dry, free-flowing characteristic of the product. The wetted product is then compacted, at a pressure of at least 100 p.s.i., followed by heating or baking the compacted product at a temperature of at least about 200° F. The product can contain air-dried, freeze-dried, or irradiated foods such as meat, fish, fish meal, cereals, fruits, vegetables, and the like. Protein fibers, such as those derived from soy protein and wheat gluten, or animal fibers, such as those derived from skin, muscles, and intestines, are optionally added to support the structure of the product. The animal fibers can be prepared by cutting, chipping, grinding, shredding, shearing, or beating animal skins such as cowhide or rawhide. The high pressures used in the process of U.S. Pat. No. 4,145,447 makes the process costly. Also, the structure-supporting fibers derived from animal tissue, which are optionally used in the process of U.S. Pat. No. 4,145,447 are low in palatability. Furthermore, a product having discrete, visually apparent, meat particles is not disclosed.

U.S. Pat. Nos. 4,215,149 and 4,229,485 disclose processes for improving the palatability of dry pet foods by applying a coating, which contains proteins derived from animals, to the surface of the pet food. In U.S. Pat. No. 4,215,149 the surface of the pet food is treated with fat and then with a phosphoric acid salt. Treatment of the surface of the pet food with meat flavors and animal proteins is optional. Heating of the coated pet food, it is disclosed, must be avoided.

In U.S. Pat. No. 4,229,485 a dry biscuit is coated with a continuous glazed liver coating and is then baked to less than 18% moisture by weight. The liver preferably constitutes at least about 50% by weight of the coating, exclusive of moisture. The liver coating contains farinaceous material and comminuted liver. The hard glazed coating, it is disclosed, has the visual appearance of a meat coating to enhance the product's attractiveness to pets. The dry biscuits to which the liver coating is applied are obtained by baking a combination of uncooked farinaceous material and uncooked meat or meat by-products. The use of the uncooked meat or meat by-products in the form of finely cut flakes, preferably having their largest dimension in the range of 15/1000 inch to 250/1000 inch, it is disclosed, is necessary for obtaining high palatability of the product. However, the use of uncooked meat or meat by-products results in blending of the protein color into the farinaceous material. Additionally, the flakes present in the biscuit are not visually apparent because of the liver coating.

According to the present invention, there is provided a dry soft canine biscuit having discrete meat and/or meat by-product particles distributed substantially uniformly throughout the biscuit. The particles are visually apparent as discrete particles, do not separate from the remaining, or farinaceous portion of the biscuit during shipping, and enhance the palatability of the biscuit by providing a flavor impact. The product is highly stable and can be packaged directly into a paper board box. The method for making the dry soft canine biscuit of the present invention is economical, does not involve the use of high pressures to compact the biscuit dough as in U.S. Pat. No. 4,145,447, avoids substantial bleeding of the animal protein color into the farinaceous material, maintains particle discreteness, and achieves substantially uniform distribution of the particles throughout the biscuit.

SUMMARY OF THE INVENTION

The present invention relates to a method for making a dry soft canine biscuit having enhanced palatability and enhanced eye appeal. Discrete meat and/or meat by-product particles are distributed substantially uniformly throughout the dry biscuit and are visually apparent to the consumer as discrete particles. The presence of meat particles substantially above or on the biscuit surface is kept to a minimum to reduce the opportunity for meat particle loss from physical abuse during transit. This particle distribution is accomplished by first dry-blending the meat particles with the non-fat solids portion of a biscuit dough, admixing the dry-blended mixture with water plus optional humectant and then adding the fat portion of the biscuit dough to form a dough. Alternatively, the water, the optional humectant, and the fat can be admixed simultaneously with the dry-blended mixture. Meat and/or meat by-product particle visual awareness and biscuit hardness maintenance are achieved by using particles which are inert with respect to the biscuit dough. Meat and/or meat by-product particle inertness is made possible through the use of particles: (a) having a moisture content of 35% by weight or less, and (b) having a water activity which is less than the water activity of the biscuit dough during mixing, if the biscuit dough ingredients were mixed without the meat and/or meat by-product particles.

DETAILED DESCRIPTION OF THE INVENTION

The dry, soft canine biscuit of the present invention comprises discrete, visually apparent meat and/or meat by-product particles which are uniformly distributed throughout the biscuit. The remaining, or non-meat and/or non-meat by-product particle portion of the biscuit is substantially free of meat particle color. The biscuits are very stable microbiologically, and can be stored without refrigeration and without a packaging barrier material such as plastic film. The biscuit can be in various shapes such as square, round, triangular, tubular, cylindrical, rectangular and the like. The preferred shapes are tubular and cylindrical. The tubular shape can contain a co-extruded farinaceous filler. The biscuits can have a thickness typical of canine biscuits. A preferred thickness is about ½".

The meat and/or meat by-product particles used in the present invention can be in the form of specs, flakes, chunks, chips, granules, and the like. The particles should be of sufficient size to as to be visually apparent to the consumer as discrete particles when in the biscuit of the present invention. Prior to incorporation into the biscuit, the meat and/or meat by-product particles should preferably have a diameter or granulation of between about 1/32 of a inch and ⅛ of an inch. The final biscuit will have particles approximately in this size range too. Mixtures of particles within this size range or particles having a given size within this range can be used.

Particle visual awareness and biscuit hardness maintenance are achieved by using meat and/or meat by-product particles which are inert with respect to the biscuit. By meat and/or meat by-product particle "inertness" is meant: (a) the particle does not smear into the biscuit dough and retains its integrity through production of the final product, (b) the meat and/or meat by-product particle color does not substantially bleed into the biscuit dough, and (c) ingredients within the meat and/or meat by-product particles do not adversely affect the hardness and microbiological stability of the final biscuit product.

Meat and/or meat by-product particle inertness is made possible by using meat and/or meat by-product particles having: (1) a moisture content of about 35% by weight or less and, (2) a water activity which is less than the water activity of the biscuit dough during mixing of the dough, if the biscuit dough ingredients were mixed without the meat or meat by-product particles. The lower water activity of the meat and/or meat by-product particles substantially prevents the flow of water and protein color from the particles to the dough during mixing of the dough ingredients and the particles. High moisture contents and a water activity above that of the dough would cause smearing of the softer particles into the dough, thereby losing meat and/or meat by-product particle integrity. Also high moisture contents could create hardness reduction by the formation of steam pockets which turn into air voids upon biscuit leavening. The discreteness of the particles is locked in during drying of the dough.

Fresh meat and/or meat by-products can be dehydrated by known methods to achieve a moisture content of less than about 35% by weight. Dehydration also reduces the water activity of the meat and/or meat by-products. Generally, fresh beef has a moisture content of about 65% by weight and a water activity of about 1.0. Dehydrating the fresh meat to a moisture content of about 40% results in a water activity of about 0.80. Dehydration to about 12-20% by weight water results in a water activity for the meat of about 0.70 and lower. Biscuit doughs generally have a water activity of about 0.90 and above upon completion of mixing of the non-fat solids portion, the water, and the fat portion of the dough. Preferably, meat and/or meat by-products having a moisture content of less than or equal to about 20% by weight are used because they remain shelf stable without refrigeration prior to incorporation into the biscuit.

Microbiological stability of the meat and/or meat by-product particle ingredient is preferably achieved through a low water activity of 0.70 or less. This low water activity is preferably achieved by dehydration. However, the water activity can also be lowered by other processes known in the art. For example, to reduce the water activity, food additives conventionally used for this purpose such as glycerin, propylene glycol, salt, corn syrup, sugar and the like can be included in the meat and/or meat by-product particles in conventional amounts.

Commercially available meats and/or meat by-products having the above low water activity can be used for the meat and/or meat by-product particle ingredient of the present invention. Microbiological stability of the meat and/or meat by-products can also be achieved even at water activities above 0.70 by the use of antimycotics together with either bacteriostats or sterilizing gases conventionally used in the art for this purpose. Exemplary of the antimycotics which can be used are potassium sorbate, sorbic acid, sodium benzoate, and the like. Suitable commercially available meat products and/or meat by-products which can be used are those which are stored without refrigeration and are packaged in a film of no more than 5 g/sq. m/24 hours water vapor transfer rate. The meat and/or meat by-product particles should also be in compliance with NRC nutritional requirements such as 20% minimum protein.

The substantial absence of meat and/or meat by-product particle color bleed into the biscuit is principally due to the use of meat products wherein the color is formed as part of the protein matrix. In these meat products the protein is present in its least soluble form, namely denatured and coagulated, and therefore the color is also insoluble. Accordingly, bleeding of the meat protein color into the remaining portion of the biscuit cannot take place.

Visual awareness of the meat particles is also effected by using meat products having a dark brown denatured meat protein color. Products having a denatured meat protein color as measured by an Agtron reflectance value of 10 or less contrasts excellently with typical biscuit doughs to effect visual awareness.

The term "meat" is understood to apply not only to the flesh of cattle, swine, sheep, goats, horses, whales, but also to other sources of animal protein, such as poultry and fish. The term "meat by-product" refers to those non-rendered parts of the carcasses of slaughtered animals, including but not restricted to mammals, poultry and fish, and includes constituents such as liver, kidney, heart, spleen, tongue, trimmings, lungs and skins, embraced by the term "meat by-products" in the *Official Publication*, "Official and Tentative Definitions of Feed Ingredients," published by the Association of American Feed Control Officials, Inc., p. 94 (1979). The flesh of some animals, such as fish and poultry may be too light in color to provide sufficient contrast with the biscuit dough so as to enhance visual awareness of the meat particles. In this case, known food colorings can be added to the meat to enhance visual awareness. The meat particles and the meat by-product particles can be used alone or in combination. Each particle may contain both meat and meat by-products from one or more animals.

The preferred meat and/or meat by-product particles are of dehydrated cured or uncured beef, most preferably containing spices. Spiced, dehydrated meat particles are highly palatable and have an apetizing odor. The preparation of dehydrated cured or uncured meat, spiced or unspiced, is well-known in the art and does not form a part of the present invention. Suitable dehydrated cured or uncured meat is commercially available and is commonly referred to as jerky, jerked beef, or jerked meat.

Commercially available, dehydrated cured or uncured meat products which contain more than 35% moisture can be dried in conventional manner to within the above moisture content range.

Known biscuit dough formulations for the preparation of dry soft canine biscuits can be used in the production of the biscuits of the present invention. As indicated above, these doughs generally have a water activity of about 0.90 and above upon completion of mixing of the dough ingredients. A suitable dough contains at least one farinaceous material, the predominant one being glutenous, salt, animal fat, flavorings, added vitamins and minerals, and an antioxidant such as those disclosed in U.S. Pat. No. 4,229,485 at column 5, lines 7 to 25 and 37 to 57, a humectant such as sugar, propylene glycol, glycerin, sorbitol, and corn syrup, and chemical leavening. The compositions of the present invention also preferably contain at least one animal-derived proteinaceous meal such as meat meal, bone meal, and fish meal. A preferred biscuit dough for producing the biscuits of the present invention contains about 40 to 50% by weight wheat flour, about 10 to 15% by weight sugar, about 5 to 15% humectant, about 3 to 10% by weight meat meal, about 1 to 5% chemical leavening, about 1 to 10% animal fat preserved with BHA, about 15 to 25% by weight water, and about 2 to 5% by weight of natural flavors, and vitamin and mineral preblend. Use of the humectant is optional, but is preferred to enhance the softness of the product and to effect less breaking force. Suitable humectants are known in the art and include glycerin, sorbitol, propylene glycol, corn syrup, and sugar. Chemical leavening, known in the art can be used. Exemplary thereof is calcium acid phosphate with sodium bicarbonate, and/or ammonium bicarbonate.

The relative amount of the meat and/or meat by-product particles and the biscuit dough should be such so as to result in a dried biscuit product wherein the weight percent of the particles is about 3 to 25% by weight, preferably about 5 to 20% by weight of the final dried biscuit product. Compliance to NRC nutritional requirements is enhanced by even these low levels of the 20% minimum protein meat and/or meat by-product particle. Lower or higher levels of the meat particles can be used provided biscuit integrity is maintained, the meat particles do not extend above the surface of the biscuit so as to separate from the biscuit during shipment, the final product remains visually attractive to the consumer, and the product is economical to produce.

In producing the soft, dry canine biscuit of the present invention the meat and/or meat by-product particles are dry-blended with the solid non-fat portion of the biscuit dough. By incorporating the meat particles into the solid non-fat portion of the biscuit dough, the meat particles are distributed substantially uniformly throughout the final biscuit product. The portion of the particles at the surface of the biscuit are visually apparent as discrete particles. Particles substantially below the surface however are also of sufficient size and integrity to be visually apparent as discrete particles upon breaking the biscuit in two, for example.

All mixing can be at 20–100 rpm. The dry-blending step is typically at room temperature for a period of time of about 3 minutes to about 10 minutes so as to obtain a uniform mixture of the meat and/or meat by-product particles and non-fat portion of the biscuit dough. The dry-blended mixture is then mixed with the hot water plus optional humectant to form a first stage dough. This methodology minimizes the occurrence of meat and/or meat by-product particles substantially above and on the final biscuit surface. As a result, the opportunity for meat and/or meat by-product particle loss from physical abuse during transit is reduced. The water which is admixed with the dry-blended mixture is typically at a temperature of about 65° F. to about 150° F. The hot water and the optional humectant is added, with mixing, over a period of time of about 3 minutes to about 10 minutes to form the first stage dough. Then, the fat portion of the biscuit dough is admixed with the first stage dough to form the final stage dough. The fat portion is added at a temperature at which it is at least fluid, typically at about 100° F. to about 150° F. The fat portion is mixed for a period of time which is sufficient to form a dough whose homogeneity is visually apparent. A typical final mixing time is about 3 minutes to about 8 minutes.

Formation of the dough is achieved at about atmospheric pressure with mixing of the components being conveniently achieved in an upright sigma blade mixer or other bakery-type mixers. The various ingredients can be added over a period of time or in a one-shot manner according to the above order of addition. However, melted fat and water plus optional humectant may be added simultaneously and mixed 6–12 minutes.

The dough is then formed into pieces by horizontal or vertical extrusion followed by cutting. The cutting is preferably substantially perpendicular to the direction of flow of the extruded dough. Thus, when horizontal extrusion is utilized, the extruded dough is preferably cut substantially perpendicular to the top surface of the oven band. When vertical extrusion is used, the extruded dough is cut preferably substantially parallel to the top surface of the oven band.

Suitable die and cutter shapes are those which result in a round, square, rectangular, triangular, tubular, or cylindrically shaped biscuit product and the like. The forming is accomplished at conventional temperatures of ambient to 110° F. and pressures of less than 75 p.s.i. (gauge), used with a horizontal or vertical extruder.

The formed pieces are then baked, followed by drying, to achieve a shelf stable product without the need for moisture barrier protection. Baking and drying temperatures and times are those conventionally used in the production of a soft, dry canine biscuit. The pieces are dried to obtain a biscuit having a water activity of 0.70 or less. Typical baking temperatures and times are about 300° F. to about an average of 475° F. for about 20 minutes to about 6 minutes. Drying conditions are typically about 200° F. to about 325° F. for about 25 minutes to about 12 minutes in a forced air dryer. On a weight basis, the moisture content of the final biscuit product is less than or equal to about 15% by weight and preferably about 10 to 12% by weight of the final biscuit at 70% relative humidity.

The hardness of the final soft biscuit of the present invention as measured in a cracking test on a Dillon dynamometer should be about 5 to about 15 lbs. for a ¼" thick sample using a pinpoint tester having a 3/32" diameter tip. The tip has a concave bottom with a maximum depth of 1/16". In this test, the hardness reading in pounds is linearly proportional to the sample thickness. Thus, a ¼" thick sample should have a hardness of about 3 to 8 lbs. A hard biscuit, as opposed to the soft biscuit of the present invention, would have a Dillon dynamometer hardness value of about 30 to about 50 lbs for a ¼" thick sample.

The present invention is further illustrated in the following example wherein all percentages, parts, and proportions are by weight and all temperatures are in °F. unless otherwise indicated:

EXAMPLE

In this example, spiced dehydrated cured beef granules having a moisture content of about 15% by weight, a granulation between 1/32 of an inch and ½ inch, and having a dark brown denatured meat protein color of Agtron reflectance value of 10 or less are used. The spiced dehydrated cured meat granules are obtained by granulating dehydrated cured meat having the composition:

| Dehydrated Cured Meat | Pounds |
| --- | --- |
| Meat By-Products | 650 |
| Meat | 268 |
| Natural Flavors | 1 |
| Spices | 29 |
| Cure (Sodium Nitrite) | 1 |
| Potassium Sorbate | 0.5 |
| | 949.5 |

Then, 150 pounds of the spiced dehydrated cured meat granules are combined with the non-fat solids portion of a soft biscuit dough, the fat portion of the soft biscuit dough and water plus humectant to form a dough in accordance with the process of the present invention. The ingredients, amounts, and the process for making the biscuits are:

| Biscuit and Meat Chips | Pounds |
| --- | --- |
| Wheat Flour (soft flour of about 9% by weight protein) | 400 |
| Sugar | 117 |
| Glycerin (humectant) | 100 |
| Dehydrated Cured Meat | 150 |
| Skim Milk Powder | 16 |
| Meat Meal | 36 |
| Chemical Leavening | 17 |
| Salt | 4 |
| Animal Fat Preserved with BHA | 75 |
| Natural Flavors | 33 |
| Vitamin and Mineral Preblend | 18 |
| Color | 1 |
| Water | 200 |
| | 1167 pounds |

The dehydrated cured meat is dry-blended with the solid non-fat portion of the biscuit dough in an upright sigma blade mixer at 20 rpm for 10 minutes. Then the 200 pounds of water, at a temperature of 150° F. plus the 100 lbs of glycerin at ambient temperature are added together with 140° F. fat to the preblend and mixed for 6 minutes to form the dough. The dough is then machined on a horizontal extruder through dies measuring ⅜" in diameter followed by vertical cutting into 1¼" length cylinders. The formed pieces are then baked in a band oven for 8 minutes followed by drying at 250° F. for 20 minutes in a band dryer to achieve a dry, soft shelf stable product have a Dillon dynamometer hardness reading of about 4 to 11 for the ⅜" thick sample. The baking temperatures in the band oven are:

| Band Oven Baking Temperatures | Zone |
| --- | --- |
| 530° F. | 1 |
| 530 | 2 |
| 550 | 3 |
| 300 | 4 |
| 300 | 5 |
| 300 | 6 |
| Off | 7 |
| Off | 8 |
| Off | 9 |

The product is dump-packed into a carton without the need for moisture barrier protection.

The hardness tests on the product are performed using a Dillon dynamometer as described above.

What is claimed is:

1. In a method for making a dry soft canine biscuit from a final soft biscuit dough containing a non-fat solids portion which contains farinaceous material and added sugar, an added fat portion and an added water portion, the improvement consisting essentially of the steps of:

(a) admixing dehydrated meat and/or meat by-product particles or meat and/or meat by-product particles having a moisture content of less than or equal to about 35 percent by weight of the particles with said non-fat solids portion of said final soft biscuit mixture to form a substantially homogeneous dry blended mixture, no fat being added in step (a) except the indigenous fat which is present in said meat and/or meat by-product particles, said non-fat solids portion containing about 10 to 15 weight percent of said added sugar, based in the total weight of said final soft biscuit dough, and said meat and/or meat by-product particles being present in an amount of about 3 to about 25 weight percent, based on the total weight of said dry soft canine biscuit;

(b) admixing said dry blended mixture of (a) with said added-water portion of said final soft biscuit dough to form a first stage dough, said added-water portion being present in an amount of about 15 to 25 weight percent, based on the total weight of said final soft biscuit dough;

(c) mixing said added-fat portion of the biscuit dough with said first stage dough to form said final soft biscuit dough, said added-fat portion being present in an amount of about 1 to 10 weight percent, based on the total weight of said final biscuit dough;

(d) forming said final soft biscuit dough into pieces under low shear non-cooking forming conditions which maintain the discreteness of said particles, using a forming pressure less than 75 p.s.i.g., and a forming temperature of up to 110 degrees Fahrenheit; and (e) baking and drying said pieces to form said dry soft biscuit, which is shelf stable, wherein the water activity of said meat particles in step (a) is 0.7 or lower and is less than the water activity of the final dough, obtained by admixing said non-fat solids portion, said fat portion and said water without said meat particles, which is at least 0.90 and whereby a dry soft biscuit is produced having discrete visually apparent meat particles distributed substantially uniformly throughout.

2. A method as claimed in claim 1 wherein said water and said fat portion in steps (b) and (c) are added simultaneously to the dry mixture of step (a).

3. A method as claimed in claim 1 wherein the particles of step (a) are shelf stable meat particles.

4. A method as claimed in claim 1 wherein the particles of step (a) have a moisture content of less than or equal to about 20 percent by weight of the particles.

5. A method as claimed in claim 1 wherein said pieces of step (d) are dried to a moisture content of 10 to 12 percent by weight of the biscuit.

6. A method as claimed in claim 1 wherein said biscuits have a hardness equivalent to a reading of 5 to 15 lbs. for a biscuit having a thickness of about ⅜ inch measured on a Dillon dynamometer having a pinpoint tester with a 3/32 inch diameter tip having a concave bottom.

7. A method as claimed in claim 1 wherein said particles have a granulation of between about 1/32 inch and about ¼ inch.

8. A method as claimed in claim 1 wherein said particles comprise spiced dehydrated meat particles.

9. A method as claimed in claim 8 wherein said particles have a dark brown denatured meat protein color of Agtron reflectance value of 10 or less.

10. A method as claimed in claim 1 wherein said particles are spiced, dehydrated, cured meat granules.

11. A method as claimed in claim 1 wherein the meat particles of step (a) have a water activity of 0.70 or less.

12. A method as claimed in claim 1 wherein the water which is admixed with the dry blended mixture is at a temperature of about 65 degrees to about 150 degrees Fahrenheit.

13. A method as claimed in claim 12 wherein the fat portion of the biscuit dough is added at a temperature of about 100 degrees to about 150 degrees Fahrenheit.

14. A method as claimed in claim 13, wherein said dry blending is conducted for a period of time of about 3 minutes to about 10 minutes, the dry blended mixture is mixed with water for a period of time of about 3 minutes to about 5 minutes, and wherein said mixing of the fat portion is conducted for a period of time of about 3 minutes to about 5 minutes.

15. A process as claimed in claim 1 wherein said forming of said final soft dough into pieces is on a horizontal extruder followed by cutting.

16. A method as claimed in claim 1 wherein said pieces are formed by vertical extruding followed by cutting.

17. A method as claimed in claim 16 wherein said pieces are cut substantially perpendicular to the direction of the flow of the extruded dough.

18. A method as claimed in claim 1 wherein said pieces are dried to obtain a soft biscuit having a water activity of 0.70 or less.

* * * * *